(12) United States Patent
Mingilino et al.

(10) Patent No.: US 8,739,743 B2
(45) Date of Patent: Jun. 3, 2014

(54) HYDROGEN FEED METHOD AND SYSTEMS FOR ENGINES

(75) Inventors: Chris Mingilino, Chicago, IL (US); Leo Bailleaux, Schaumburg, IL (US); Charlie Corry, Chicago, IL (US); Thomas Fornarelli, Chicago, IL (US); Timothy T Tutt, Mattoon, IL (US); Anatoly Kalmanovsky, Buffalo Grove, IL (US)

(73) Assignee: Go Green Hybrid Fuel Systems, Chicago, IL (US)

( * ) Notice: Subject to any disclaimer, the term of this patent is extended or adjusted under 35 U.S.C. 154(b) by 0 days.

(21) Appl. No.: 13/431,791

(22) Filed: Mar. 27, 2012

(65) Prior Publication Data

US 2013/0255596 A1    Oct. 3, 2013

(51) Int. Cl.
| | |
|---|---|
| *F02B 63/00* | (2006.01) |
| *F02B 43/08* | (2006.01) |
| *F02B 63/04* | (2006.01) |
| *F02B 77/13* | (2006.01) |
| *F02B 75/16* | (2006.01) |
| *F02B 43/10* | (2006.01) |
| *F02M 27/02* | (2006.01) |
| *F02M 25/12* | (2006.01) |
| *F02B 1/04* | (2006.01) |

(52) U.S. Cl.
CPC ........... *F02B 63/04* (2013.01); *F02B 2063/045* (2013.01); *F02B 63/044* (2013.01); *F02B 77/13* (2013.01); *F02B 75/16* (2013.01); *F02B 43/10* (2013.01); *F02M 27/02* (2013.01); *F02M 25/12* (2013.01); *F02B 1/04* (2013.01); *F02B 43/08* (2013.01)
USPC .................................................. 123/2; 123/3

(58) Field of Classification Search
CPC .. F02B 63/04; F02B 2063/045; F02B 63/044; F02B 77/13; F02B 75/16; F02B 43/10; F02B 1/04; F02B 43/08; F02M 27/02; F02M 25/12
USPC .................................................. 123/2, 3, 2.3
See application file for complete search history.

(56) References Cited

U.S. PATENT DOCUMENTS 2,454,047 A * 11/1948 Finch et al. .................... 562/510
4,020,798 A * 5/1977 Skala ............................. 123/1 A (Continued)

OTHER PUBLICATIONS

First Aid Only, Isopropyl Alcohol, Nov. 19, 2008, First Aid Only, p. 1 www.firstaidonly.com/Products/Isopropyl-Alcohol-99--16oz--1-each_M314.aspx (Alcohol Reference).*

(Continued)

*Primary Examiner* — Lindsay Low
*Assistant Examiner* — Charles Brauch
(74) *Attorney, Agent, or Firm* — Cherskov Flaynik & Gurda, LLC

(57) ABSTRACT

A method for enriching air with hydrogen for subsequent use by internal combustion engines is discussed. The method begins with supplying a modified form of water. Subsequently, the method continues with electrolyzing the water to produce hydrogen gas. Next, the method involves mixing the gas with air to produce a hydrogen-air mixture, and injecting the mixture into the air intake of a combustion engine. Also discussed is a system for enriching internal combustion engine air intake with hydrogen gas. The system uses modified water, an electrolysis unit for producing hydrogen gas from the modified water. The system mixes the gas with ambient air to create a mixture, and a venturi-based injector introduces the mixture into the air intake system of the engine.

13 Claims, 17 Drawing Sheets

A

B

(56) References Cited

U.S. PATENT DOCUMENTS

| | | | | |
|---|---|---|---|---|
| 4,411,223 | A | * | 10/1983 | Kiely .................................. 123/3 |
| 4,528,947 | A | * | 7/1985 | Olivera ............................. 123/3 |
| 6,127,056 | A | * | 10/2000 | Wheeler et al. ................ 429/429 |
| 6,203,935 | B1 | * | 3/2001 | Stuhler et al. .................. 429/437 |
| 6,217,713 | B1 | * | 4/2001 | Lee et al. ....................... 204/164 |
| 6,372,230 | B1 | * | 4/2002 | Schincaglia et al. ........... 424/401 |
| 7,089,888 | B2 | | 8/2006 | Mirji |
| 2009/0000574 | A1 | * | 1/2009 | Sugimasa et al. ................. 123/3 |
| 2009/0193781 | A1 | * | 8/2009 | Haase ........................... 60/39.12 |
| 2010/0075251 | A1 | * | 3/2010 | Fujii et al. .................... 430/270.1 |
| 2010/0275858 | A1 | * | 11/2010 | Jeffs et al. ......................... 123/3 |
| 2010/0275859 | A1 | * | 11/2010 | Klotz .................................. 123/3 |
| 2011/0017957 | A1 | * | 1/2011 | Gaillard et al. ................. 252/511 |
| 2011/0108432 | A1 | * | 5/2011 | Malkowsky et al. ........... 205/338 |
| 2011/0210008 | A1 | | 9/2011 | Kumarasamy |
| 2011/0251115 | A1 | * | 10/2011 | Dupont et al. .................. 510/357 |
| 2011/0253070 | A1 | * | 10/2011 | Haring .............................. 123/3 |

OTHER PUBLICATIONS

Way Back Machine, Dating the Alcohol Reference, web.archive.org/web/ Nov. 15, 2013.*

* cited by examiner

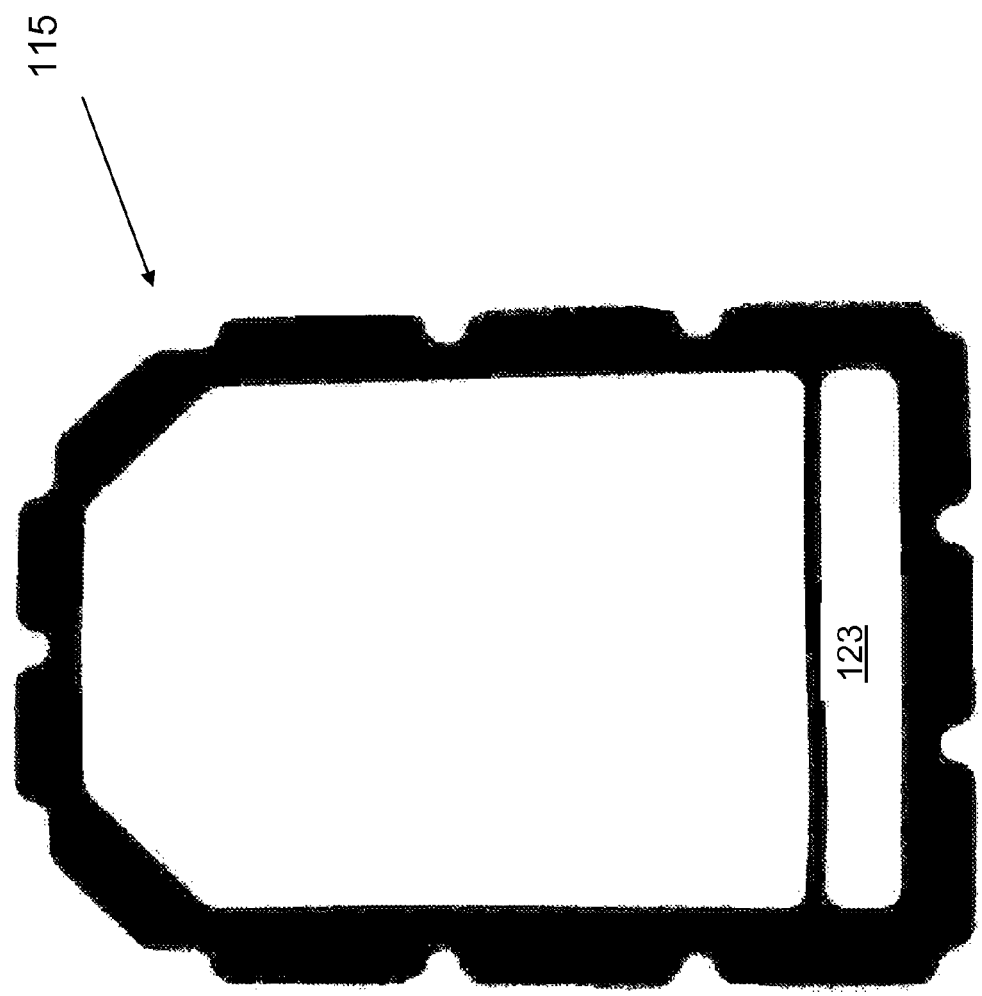

HYDROGEN FEED METHOD AND SYSTEMS FOR ENGINES

BACKGROUND OF THE INVENTION

1. Field of the Invention

This invention relates to a device and method for supplying hydrogen gas to an air intake system, and more particularly, this invention relates to a device and method for in situ production and utilization of hydrogen gas in internal combustion engines.

2. Background of the Invention

The need for increase fuel efficiency and lower emissions has reached a critical state. State of the art systems for internal combustion engines have become increasingly complex, with the latest developments including an amalgam of hybrid vehicle drive trains, complex fuel reforming systems and alternate fuel storage systems.

Current fuel reforming designs utilize liquid petroleum fuels in attempts to crack those feedstocks to single carbon moieties, or even hydrogen gas. While reforming processes provide a source of clean fuel, hydrogen, green house gases and related pollutants are produced. Further, these systems are extremely complex and therefore expensive to implement at this time.

U.S. Pat. No. 7,089,888 discloses a steam generator coupled with the exhaust from an internal combustion engine connected to a reformer. The outlet from the reformer is connected to a hydrogen separation membrane. The hydrogen product can then be fed to the internal combustion engine for use as a supplemental fuel. This system requires a number of separate subcomponents, each of with must function for the overall hydrogen generator to provide a supplemental fuel. Further, this device uses hydrocarbon based fuel, a costly fuel as its main source of energy.

U.S. Published Application No. 2001/0210008 discloses a system using a distilled water source in combination with a porous electrode with a steam electrolysis chamber to generate a hydrogen feed to supply an internal combustion engine. Since the system uses distilled water, the system relies on the conductivity of pure water, which is low due to a limited source of conductive ions. There is a need to increase the conductivity of the fluid to improve the separation efficiency.

A need exists in the art for a simple fuel additive system for use with internal combustion engines. The system should be adaptable to current technologies. Further, should the system stop working due to loss of additives or system malfunction, the underlying drive trains should continue to function while the alternate fuel system is unavailable. The system should also utilize currently available feedstocks and provide in situ production of the fuel additive.

SUMMARY OF INVENTION

An object of the invention is to provide a method and device for supplying hydrogen gas that overcomes many of the disadvantages of the prior art.

Another object of the invention is to provide a method for in situ production and direct injection of hydrogen gas into air intake manifolds of engines. A feature of the invention is the electrolysis of modified water. An advantage of the invention is that the modified water is a year-round feedstock for the production of on-demand hydrogen gas, thereby eliminating the problems associated with storage of not yet used hydrogen.

Another object of the present invention is to provide a source of oxygen enriched gas to promote efficient combustion. A feature of the invention is the utilization of oxygen byproduct gas from the production of hydrogen as a combustion enhancing gas. An advantage of the invention is an increase in combustion of hydrocarbons within an internal combustion engine by the increase of oxygen in the air intake of the internal combustion engine.

Briefly, the invention provides a method for enriching air with hydrogen for subsequent use by internal combustion engines, the method comprising supplying a modified form of water; electrolyzing the water to produce hydrogen gas; mixing the gas with air to produce a hydrogen-air mixture; and injecting the mixture into the air intake of a combustion engine.

Also provided is a system for enriching internal combustion engine air intake with hydrogen gas, the system comprising modified water; a means for producing hydrogen gas from the modified water; a means for mixing the hydrogen gas with air to create a mixture; and a means for injecting the mixture into the air intake system of the engine.

BRIEF DESCRIPTION OF DRAWING

The invention together with the above and other objects and advantages will be best understood from the following detailed description of the preferred embodiment of the invention shown in the accompanying drawing, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method and device for all weather production of hydrogen gas for direct injection of the gas into internal combustion engines, such as diesel engines. The method and device are operational at temperatures starting as low as −20° F. (−29° C.) without the need for preheating the hydrogen gas/air mixture or other heat input. In another embodiment, the method and device are operational to temperatures as low as −50° F. (−46° C.). In an embodiment of the invention the method and device operate at temperatures between −50 F and 32 F without the addition of an external heat source.

The invention increases fuel efficiency by about 5 to 30 percent while decreasing emissions by 20-60 percent. Also, in situations where the invented system is not operational, the underlying internal combustion engine continues to operate.

Inasmuch as the fuel enhancer utilized is pure hydrogen, a more complete fuel burn results, leading to increased engine performance, reduced maintenance costs, and cleaner exhaust. Further, the production of oxygen as by-product of the hydrogen separation provides for improved combustion.

Figure 1:
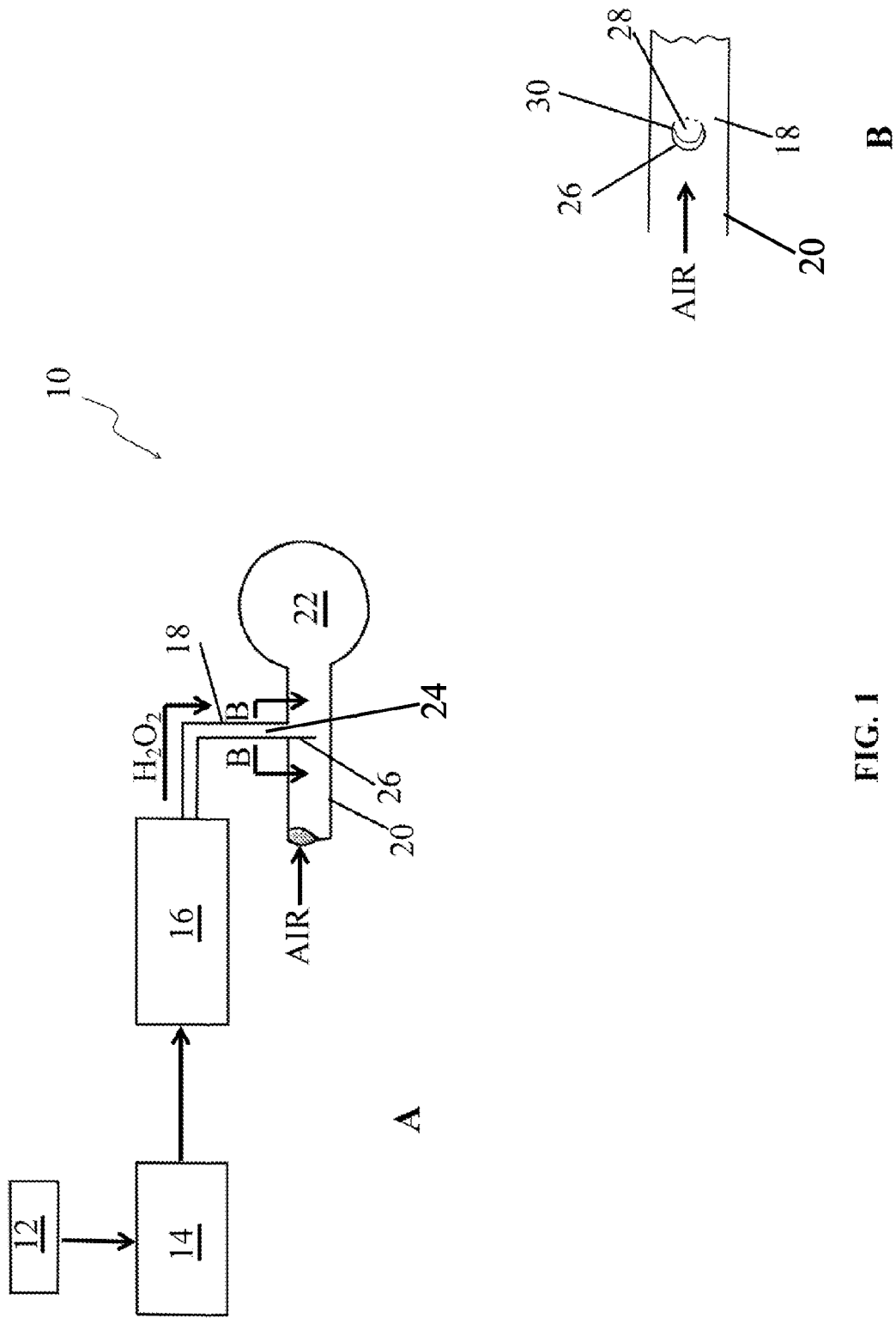
FIG. 1A is a schematic view of a hydrogen gas injection system, in accordance with features of the present invention.
FIG. 1B is a view of FIG. 1A taken along lines B-B.

FIG. 1 is a schematic diagram of the invented system, designated as numeral 10. Hydrogen reaction fluid (HRF) 12 is supplied to an electrolyzer 14 or other means for electrically separating water into its components hydrogen and oxygen. Concomitant with its production, the hydrogen and oxygen are collected by a reservoir/hydrogen delivery unit 16. This reservoir circulates the modified water back to the electrolyzer for further electrolysis, while shunting the hydrogen gas and oxygen gas downstream of the reservoir 16 to an air intake port 18 of an internal combustion engine. Inasmuch as the hydrogen and oxygen gases are not added to the liquid fuel stream, but rather to the air intake system, the potential for voiding manufacturer warranties is obviated.

Air is mixed with the produced hydrogen and oxygen via a venturi tap, as depicted in FIGS. 1A and 1B. The tap 18, generally cylindrical in shape, accesses an air feed conduit 20 of the engine's air intake system, in one embodiment downstream of the system's air filtering system (not shown) but upstream of the engine's air charging unit 22. This charging unit has substantially direct fluid communication and ingress to the engine combustion chambers, i.e, piston cylinders.

The hydrogen gas discharge port 24 from the system 10 extends into the air feed conduit 20 or engine air intake so as to define an upstream-facing convex surface 26 such that the up-stream side faces the air source (air intake). The port 24 further defines a downstream-facing concave surface 28 so as to be facing in the direction of the airflow through the conduit 20. Bernoulli Effect occurs as air strikes the convex surface such that a low pressure zone is created on the trailing or lateral edges 30 of the concave surface. This low pressure zone provides a means for pulling hydrogen gas from the concave side of the venturi tap and toward the engine's combustion chamber.

Figure 2:
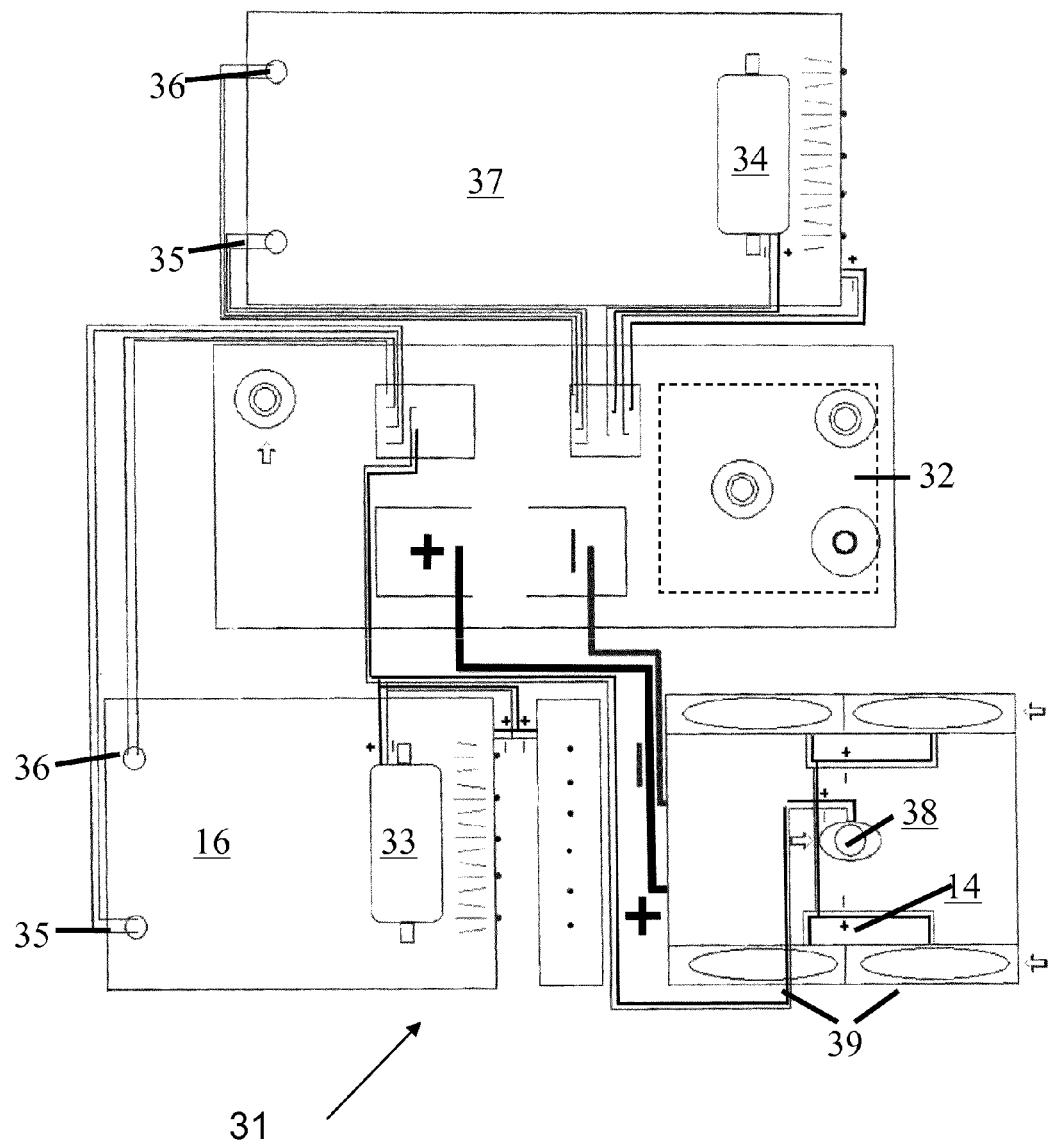
FIG. 2 is an electric schematic of the invented system, in accordance with features of the present invention.

FIG. 2 is an electrical schematic of the invented system, shown generally at 31. Central to the system is a computer controlled power module 32 in electrical communication with both the electrolyzer 14 and the reservoir 16. The computer control module 32 monitors' liquid pumps 33 and reserve pump 34. Fluid levels are monitored by fluid low sensors 35 and fluid full sensors 36 in reservoir 16 and the optional reservoir 37. Temperature sensor 38 monitors temperature in the electrolyzer and adjusts the fan 39 speeds accordingly. Depending on the volume of hydrogen gas required the computer control module 32 will determine power requirements to the electrolyzer. For example, when 3.5 to 10 liters of hydrogen gas per minute are required, between 10 and 100 amps are suitable. While in another embodiment of the invention, with between 50 and 60 amps typical.

Figure 3:
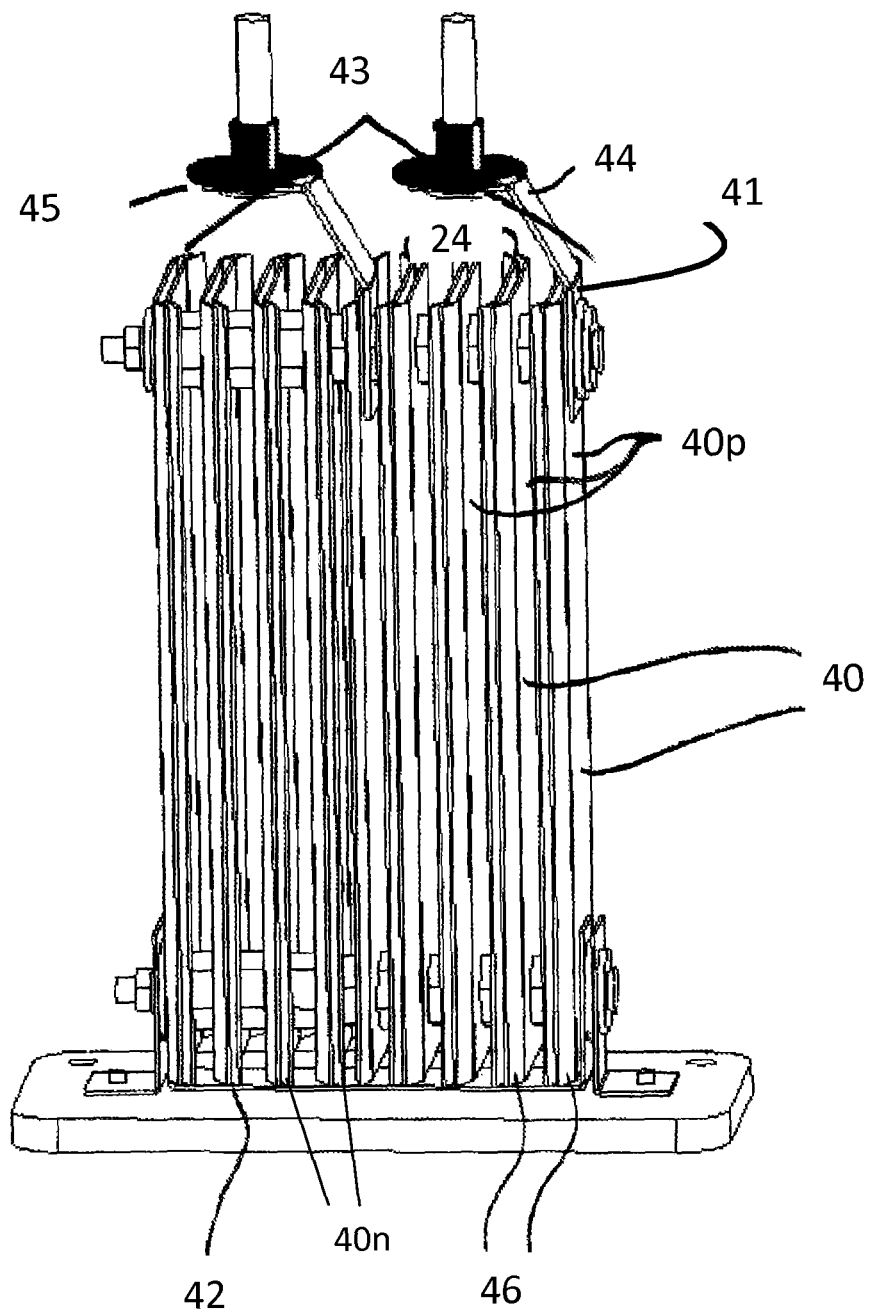
FIG. 3 is an perspective view of a plurality of electrolyzer plates in accordance with features of the present invention.

Another important salient feature of the invention is the configuration of the electrolyzer 14. FIG. 3 is a diagram of an exemplary electrolyzer 14, comprising a plurality of parallel, vertically extending plates 40, having positive plates 40$p$ and negative plates 40$n$ such that the plates, so arranged form a horizontally disposed stack. Each of the plates has a first end 41 and a second end 42 such that the edges defining the first ends in the plates are facing upward and the edges defining the second ends are facing downward. Thus, the first ends are arranged to all terminate in the same plane, thereby forming a fluid interface 43. Likewise, the second ends are arranged to all terminate in the same plane, also forming a fluid interface.

A plurality of electrodes is positioned at either fluid interface 43. In the embodiment illustrated, a positive electrode 44 is in electrical communication with a first plate type 40$p$ of the stack. A negative electrode 45 is in electrical communication with a second plate type 40$n$ of the stack. Each plate of the first plate type 40$p$ is mounted in opposition to, but in electrical isolation from, each plate of the second plate type 40$n$. Intermediate the first and second plate types are positioned a neoprene gasket or other reversibly deformable substrate so as to maintain electrical isolation of one plate from the other.

Notwithstanding the foregoing, the plates are arranged relative to each other to facilitate fluid flow between them, that fluid being liquid, gas, or a combination thereof.

The plates are shown in flat configuration, with laterally disposed peripheral edges 46 of the plates curved so as to reside outside of the plane containing the flat portion of their respective plate. The curve is made such that the edges of each of the plates are pointed toward a negative electrode. This configuration facilitates hydrogen gas production in the stack and flow out of the stack.

Figure 4:
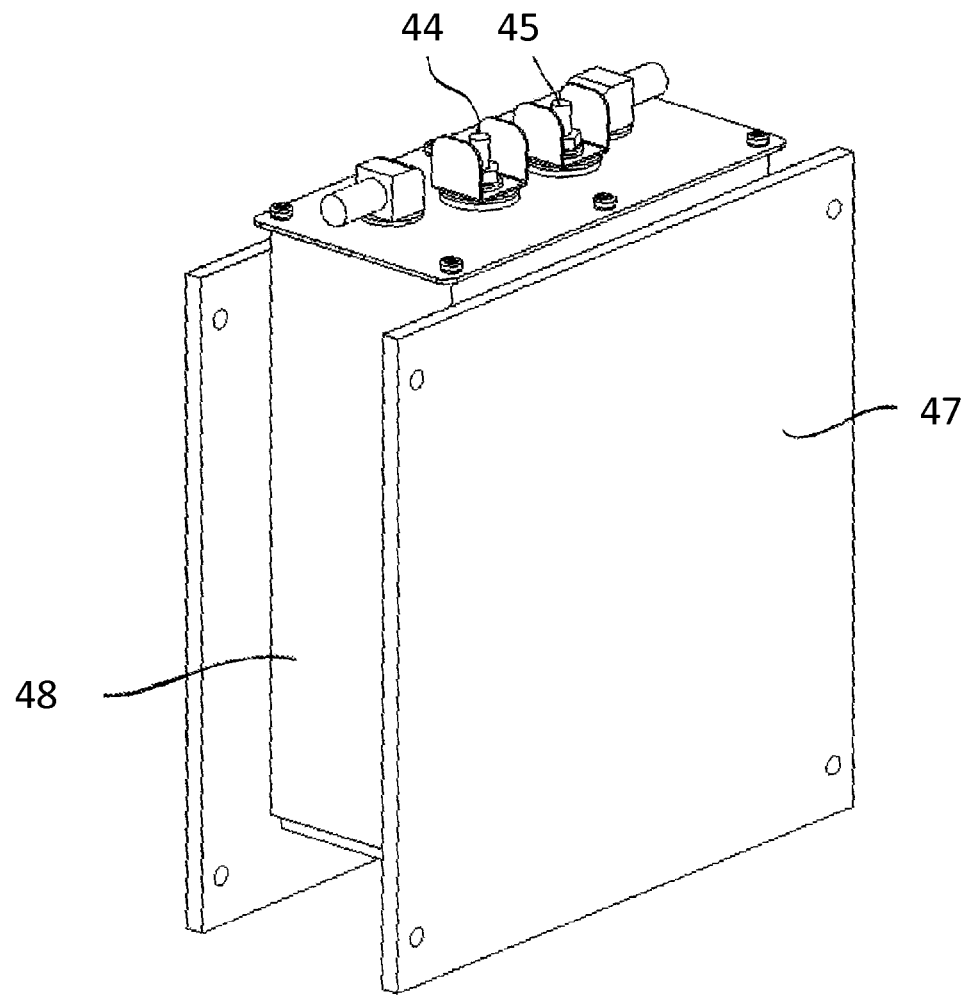
FIG. 4 is a perspective view of an electrolyzer housing, in accordance with features of the present invention.

The electrolyzer 14 is housed or otherwise encapsulated in a leak-proof housing, such as that designated as element 47 in FIG. 4. The housing is adapted to slideably receive the nubs defining the ends of the electrodes 44 and 45 so as to form a hermetic seal between the inside of the housing containing the electrolyzer and HRF 12 and the outside of the housing exposed to ambient atmospheric temperatures and pressures.

Figure 5:
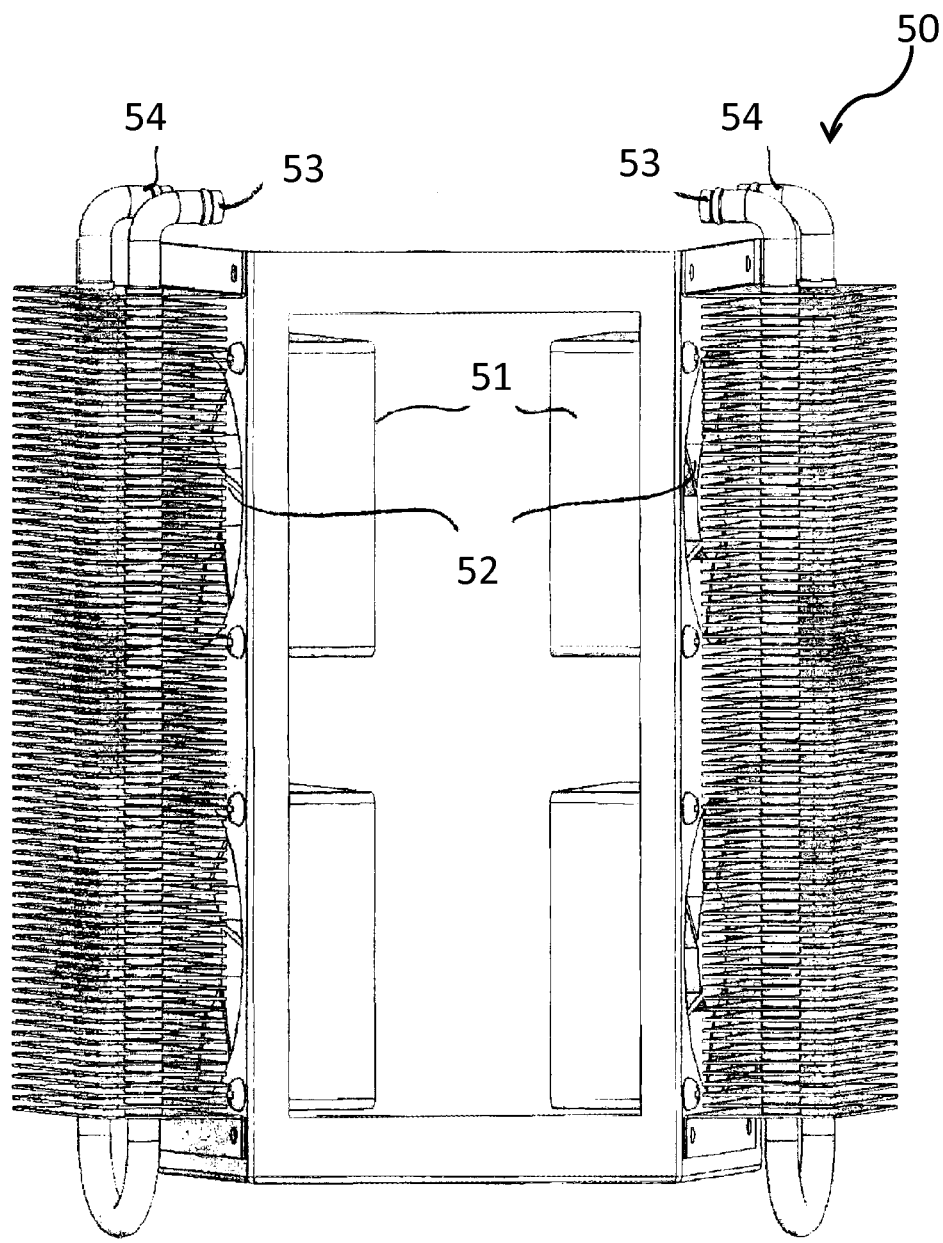
FIG. 5 is a perspective view of a heat exchange system for use in conjunction with the electrolyzer housing, in accordance with features of the present invention.

Exterior regions 48 of the housing 47 are adapted to be in thermal communication with a heat exchange unit 50 such as one depicted in FIG. 5. In one embodiment of the invention, shrouds 51 in fluid communication with thermostatically controlled fans 52 are adapted to be in mating communication with the exterior regions 48 of the housing. Ingress 53 and egress 54 fluid ports facilitate inflow and outflow of heat exchange fluid, such as antifreeze, HRF, or other liquid.

Reaction Fluid Detail

A salient feature of the invention is the utilization of modified water. This water contains a mixture of alkali metals and alcohols in amounts sufficient to assure adequate hydrogen gas production during electrolysis at ambient atmospheric temperatures and pressures heretofore not conducive to the use of water electrolysis. Initially, water substantially free from impurities, is modified with a mixture of alkali metals and alcohols. In an embodiment of the invention, filtered water is modified with a mixture of alkali metals and alcohols. In another embodiment of the invention, distilled water is modified with a mixture of alkali metals and alcohols.

No preheating or externally applied heat is necessary to assure operation of the electrolysis step obviates the need for the application of heating elements seen on prior art systems. A means for lowering the melting point of the water solution is via the addition of alcohol. Surprisingly and unexpectedly, the inventors found that the use of medical grade isopropyl alcohol (i.e., between about 95 and 99% by weight) provides the purity and hydrogen bonding disruption normally associated with neat water to keep the reaction fluid in liquid phase at least down to temperatures of −20 F (−29° C.) without the need for preheating the hydrogen gas/air mixture or other heat input. In another embodiment, the method and device are operational to temperatures as low as −50° F. (−46° C.). One embodiment of the medical grade alcohol is that substantially all of the alcohol in the isopropyl alcohol mixture is comprised of the isopropyl group and that less than 5% of the alcohol comprises ethyl alcohol. In an embodiment of the invention the method and device operate at temperatures between −50 F and 32 F without the addition of an external heat source.

Separately, the inventors found that the addition of alkali metals to the water provides a means for facilitating production of hydrogen during electrolysis. As such, alkali metals such as potassium, sodium, and lithium are contained in the modified water. Exemplary alkali metal moieties are hydroxides such as KOH, and NaOH. Suitable salts for use in the hydrogen reaction fluid (HRF) include, but are not limited to, those itemized in Table 1.

TABLE 1

| Salts For Use in Modified Water | Chem. Abstract Service Ref. |
|---|---|
| Potassium Carbonate ($K_2CO_3$) | C.A.S. 584-08-7 |
| Sodium Carbonate ($NaCO_3$) | C.A.S. 497-19-8 |
| Potassium Hydrogen Carbonate ($KHCO_3$) | C.A.S. 298-14-6 |
| Sodium Hydrogen Carbonate ($NaHCO_3$) | C.A.S. 144-55-8 |
| Potassium Hydrogen Sulfite ($KHSO_3$) | C.A.S. 7773-03-7 |
| Sodium Hydrogen Sulfite ($NaHSO_3$) | C.A.S. 7631-90-5 |
| Potassium Hydroxide (KOH) | C.A.S. 1310-58-3 |
| Sodium Hydroxide (NaOH) | C.A.S. 1310-73-2 |
| Potassium Sulfate ($K_2SO_4$) | C.A.S. 7778-80-5 |
| Sodium Sulfate ($NaSO_4$) | C.A.S. 7757-82-6 |
| Potassium Sulfite ($K_3SO_3$) | C.A.S. 10117-38-1 |
| Sodium Sulfite ($NaSO_3$) | C.A.S. 7757-83-7 |

Preferably, the minimum chemical salt addition amount ranges from as little as about 0.4% by weight for the highly ionized compounds up to about 10% by weight for the less ionizable compounds, with the remainder consisting of a substantially clean source of water, to bring the total to 100%. However, the invented system still operates reliably to produce hydrogen and oxygen gases from the HRF at even higher chemical salt concentrations, for example from about 0.50% to 20% weight %, with the remainder consisting of a substantially clean source of water, to bring the total to 100%. In another embodiment of the invention, the salt concentration ranges from about 0.6% to about 10% weight %, with the remainder consisting of a substantially clean source of water, to bring the total to 100%. It is believed that the presence of ions increases the conductivity of the HRF, thereby improving the generation of hydrogen and oxygen.

In one embodiment of the invented method, salt concentrations are minimized. This is because their relative concentrations increase as the hydrolysis runs its course, i.e., as more hydrogen and oxygen gases are produced from the fluid and the liquid volume left in the system decreases.

Also, safety hazards to the operator and service personnel tend to decrease with decreasing salt concentrations used.

Finally, when lower (i.e., about 0.04% to about 5%) salt concentrations are used; disposal considerations and hazards are minimized.

In one embodiment, the reaction fluid contains substantially deionized water (e.g., less than approximately 80 mg/L dissolved solids (200 mhos/cm specific conductance) and preferably less than 40 mg/L (100 mhos/cm) and most preferably between about 0 mg/L and 20 mg/L dissolved solids (up to 50 mhos/cm). In another embodiment of the invention, distilled water, having similar levels of dissolved solid and conductance as deionized water, is used. In another embodiment, purified water is used as the starting point for the fluid. The deionized feature provides a means for minimizing the initial electrical conductive aspects of the resulting mixture, thereby providing for a control conductivity of the final mixture.

Alternate System Detail

Figure 6:
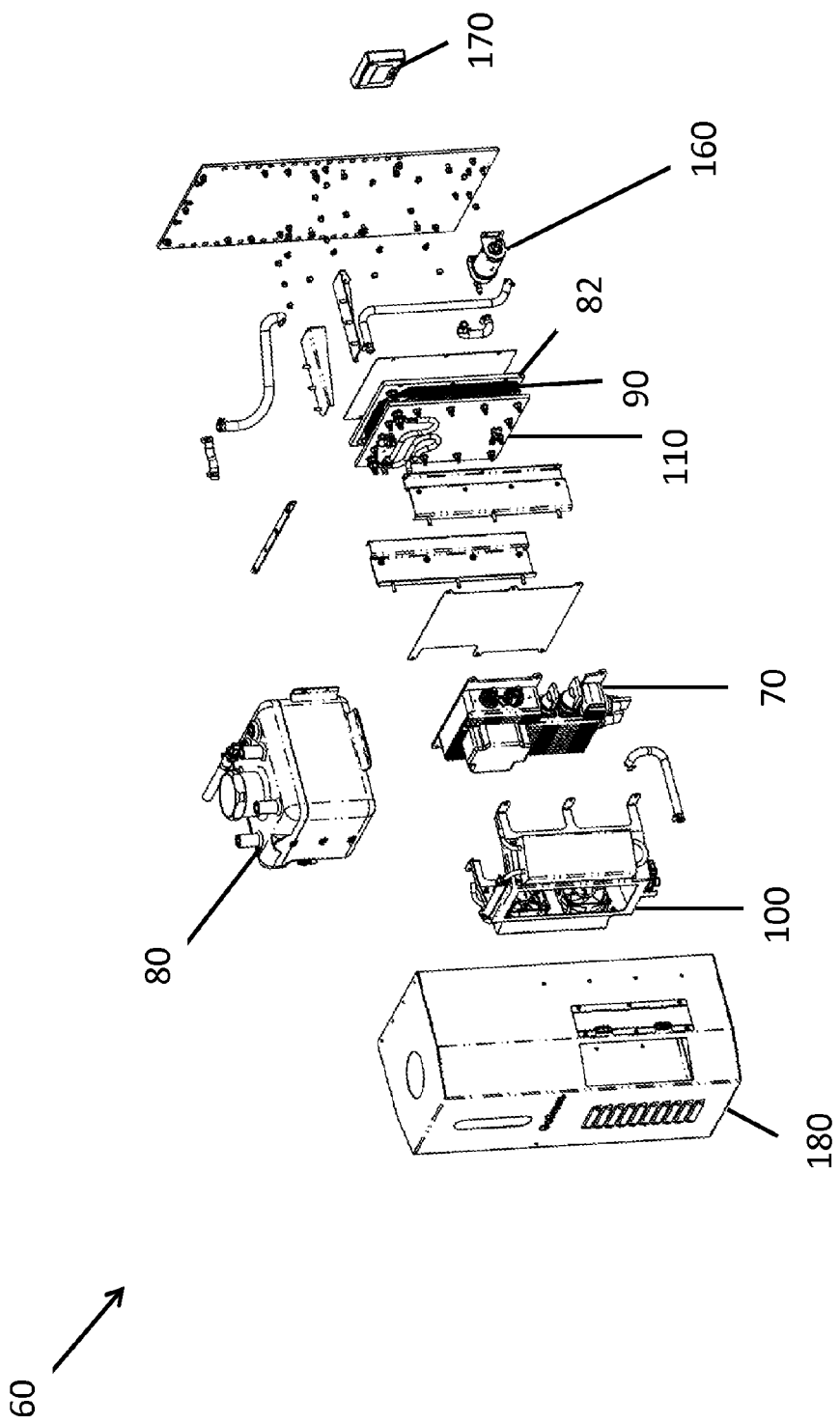
FIG. 6 is an exploded view of an embodiment of the invention illustrating the interrelationship of the components.

In an embodiment of the invention, the system as shown generally at 60 in FIG. 6. The system 60 is controlled by electronics control 70 system module, which directs fluid from tank/reservoir 80 through intercooler 100 to primary electrolyzer/hydrocell 110 where hydrogen gas and oxygen are produced in an aqueous carrier fluid. The fluid is returned to the tank/reservoir 80 where hydrogen and oxygen are separated from the HRF. Hydrogen and oxygen are fed to the air intake for the engine for injection into a combustion engine. HRF is stored in the tank/reservoir 80 where it is recycled through the intercooler 100 to repeat the cycle of decomposition of HRF into hydrogen and oxygen. In an alternate embodiment an alternate electrolyzer/hydrocell 130 (FIG. 11A) may be used for treatment of the HRF. Fluid flow through the system is governed by pump 160 under control of electronics control 70 system module. System information is provided to the vehicle operator/user through display device 170. Cover 180 protects invention components from dirt and moisture.

Electronic Control system Detail

Figure 7:
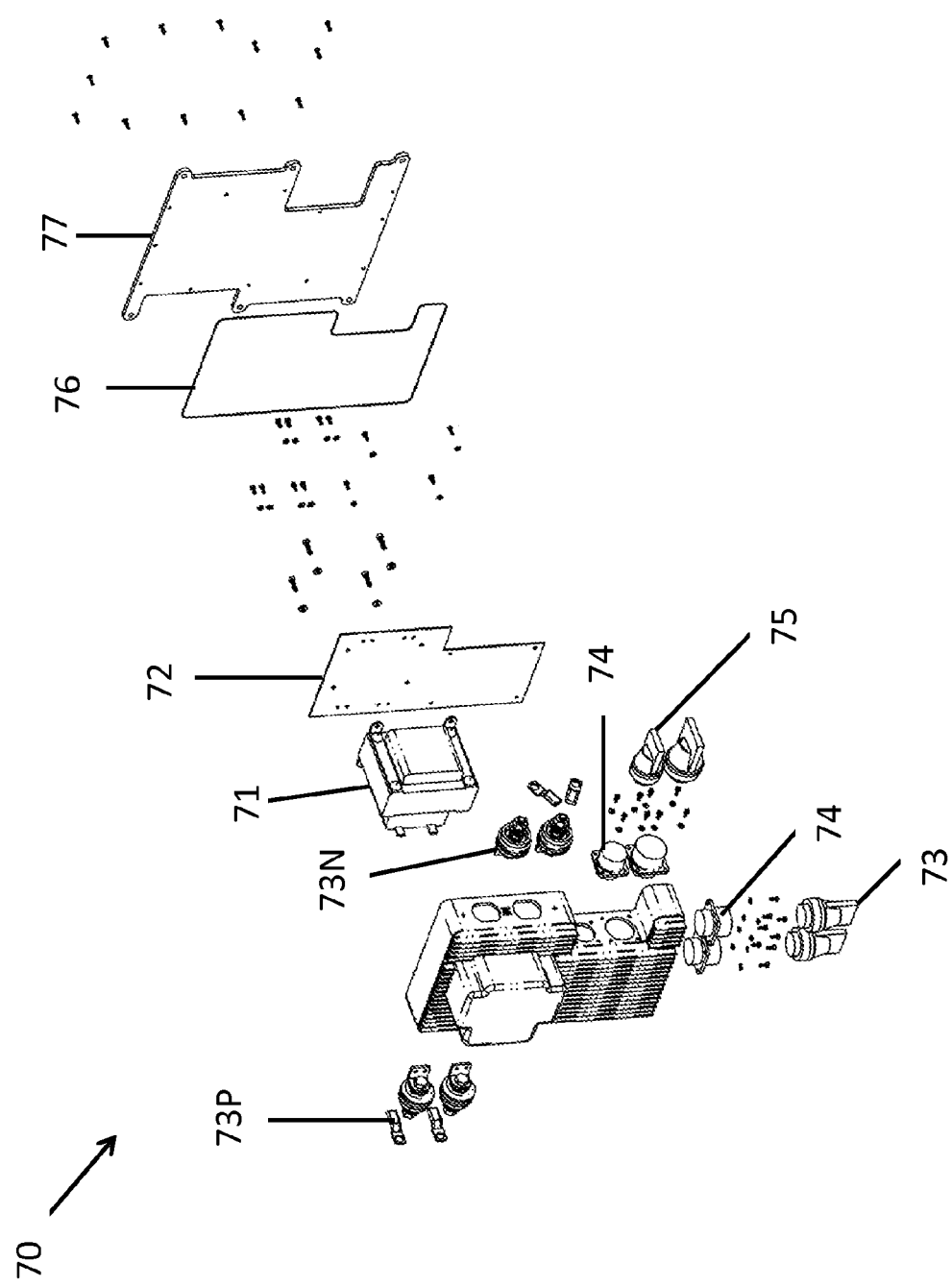
FIG. 7 is an exploded view of electronic control system of the invention.

The electronics control system module 70 as shown in greater detail in FIG. 7 provides control over the operation of the system and feedback to the vehicle operator via display device 170. Electronic controller 71, controls flow of liquid from tank/reservoir 80 through intercooler 100 and on to electrolyzer/hydrocell 110 or alternate electrolyzer 130, which produces hydrogen, oxygen and/or residual HRF. The hydrogen, oxygen and/or residual HRF are returned to the tank/reservoir 80 under control of controller 71. In another embodiment, the hydrogen and oxygen may be separated from the HRF prior to returning the HRF to the tank/reservoir.

The electronic controller 71 is a microprocessor based system, which controls and monitors power to the separation cell and to other components like the fan, pump and displays. It also monitors temperature and voltage levels of the vehicle power and provides a graphic user interface to allow adjust to the system. The microcomputer implements several control processes to provide automated and safe operation of the system. The software also employs several strategic procedures to implement fault tolerances in the event of hardware failure. This will allow the system to recover, if possible, operate at a diminished level, or if necessary, perform a safe shutdown process.

The electronic controller 71 monitors pump 160 operation, HRF flow, air temperature, fan speed, fan voltage and current, operating HRF fluid temperature, the presence of fluid in tank/reservoir 80, the absence of fluid in the tank/reservoir 80, the level of fluid in the tank/reservoir 80, operating voltage and amperage, hydrogen generation, oxygen generation, as well as communicating with the electronic control module (ECM) of the vehicle or engine and monitors engine RPM, vehicle battery voltage and current and vehicle voltage and current from a generator. In one embodiment of the invention, the controller provides power to electrolyzer/hydrocell. In another embodiment power to the electrolyzer/hydrocell is provided separately. Circuit board 72 provides power and routing of inputs and outputs. Negative power bushing 73N and positive power bushing 73P provide power to the controller 71. Connectors 74 and plugs 75 provide input/output connection of the controller 71 with other component of the invention. Support plates 76 and bottom cover 77 isolate the electronics control system module 70 from other components of the invention.

Based on information from the vehicle or engine ECM, the electronic controller determines the hydrogen needs of the vehicle or engine and adjusts operating parameters accordingly. In one embodiment, when the engine is idling (low RPM), the controller reduces or stops the production of hydrogen and oxygen by reducing HRF flow and the voltage and current applied to the primary electrolyzer/hydrolyzer or the alternate electrolyzer/hydrolyzer.

In another embodiment, when the engine is operating at a moderate load (approximately 1500 RPM), the controller increases voltage and amperage to a moderate level (30 amps) and provides an intermediate flow by increasing voltage and current to pump.

In another embodiment, when the engine is operating at a high load (approximately 2500 RPM), the controller increases voltage and amperage to a higher level (60 amps) and provides a high HRF flow by increasing voltage and current to pump.

The electronic controller calculates hydrogen and oxygen production based on electrolyzer operating temperature, current and voltage to match the hydrogen and oxygen production to the requirements of the engine under the different load scenarios. In one embodiment of the invention, the electronic controller may shut down the electrolyzer/hydrolyzer or alternate electrolyzer/hydrolyzer and pump if the electronic controller detects specific critical situations. These critical situations may include, but are not limited to, lack of HRF, low engine voltage, excessive HRF temperature or high intercooler air temperature. The electronic controller can record (log) the time and duration of the shutdown to assist the vehicle operator in determining corrective action.

Figure 8A:
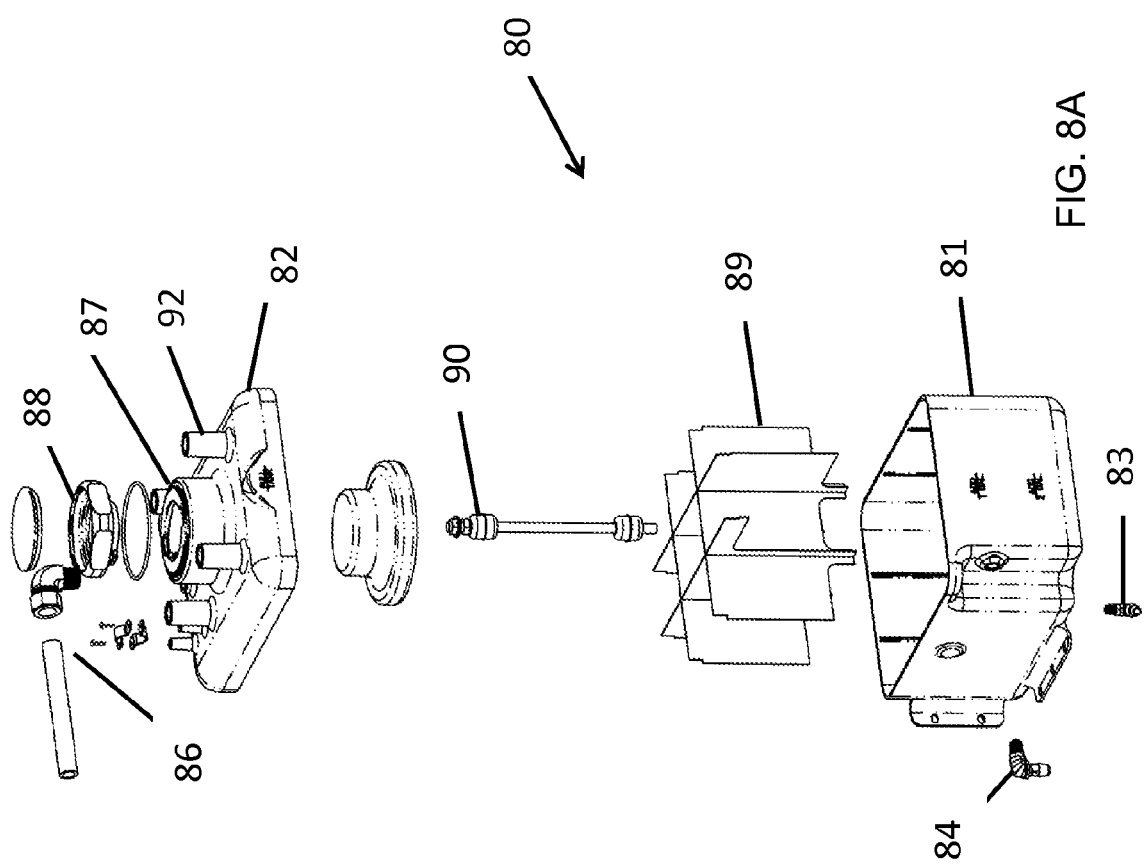
FIG. 8A is an exploded view of tank/reservoir of the present invention.
Figure 8B:
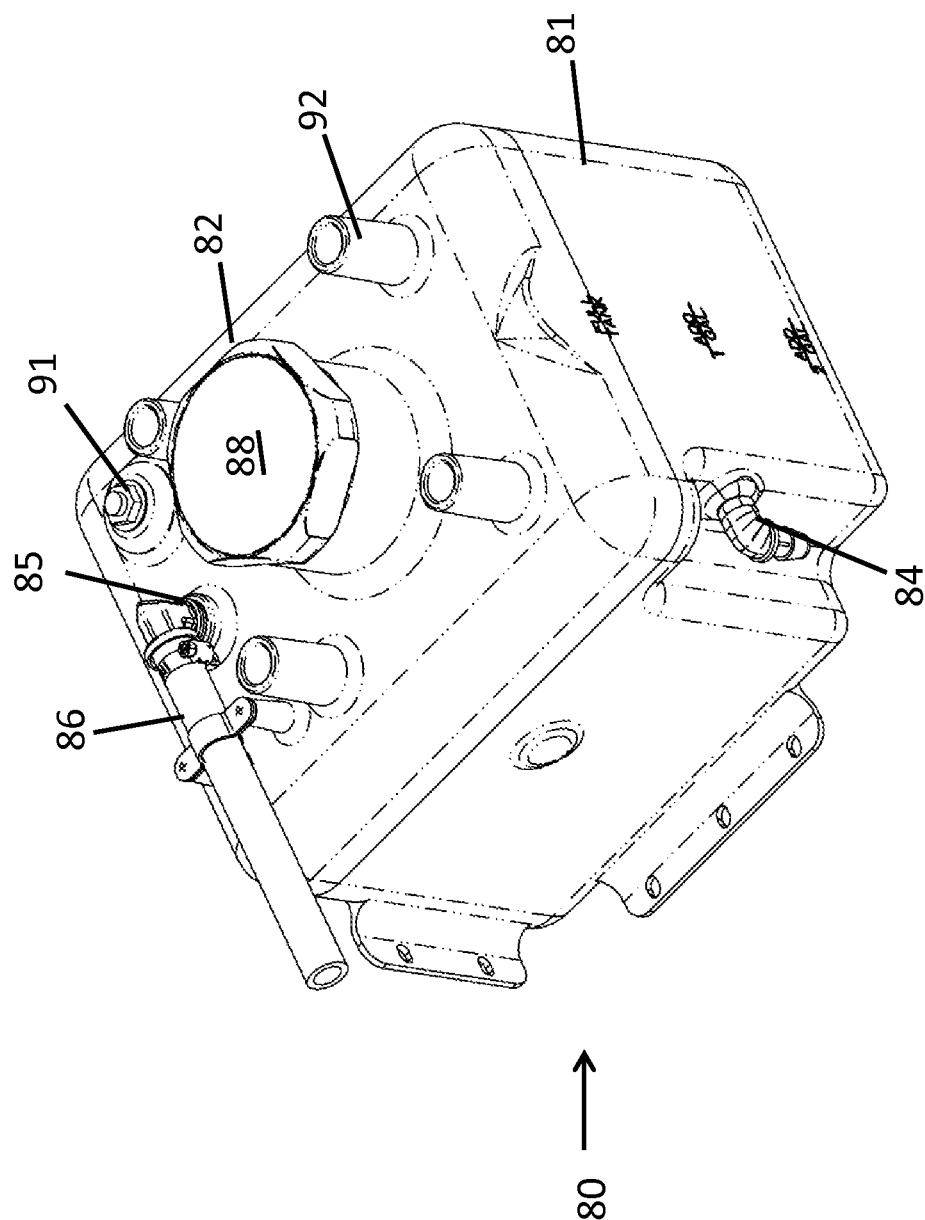
FIG. 8B is a perspective view of the tank/reservoir of the present invention.

The first embodiment of tank/reservoir 80 as shown in greater detail in FIGS. 8A and 8B includes a canister 81 and cover 82 for containing HRF for electrolysis as well as channeling separated gases for injection into the air intake of the engine. The tank/reservoir 80 also recycles non-electrolyzed HRF to be returned to electrolyzer for further processing/treatment. HRF feed from exits the tank/reservoir through outlet connector 83, connected to the base of canister 81, and passes via conduits to intercooler 100 where excess heat is removed from the HRF and passed on to primary electrolyzer/hydrocell 110. Hydrogen gas, oxygen and non-electrolyzed HRF are fed back to tank/reservoir 80 through inlet 84 connector. In an alternate embodiment a secondary electrolyzer/hydrocell 130 (FIG. 11A) may be used for treatment of the HRF. Hydrogen and oxygen separate from the HRF in the reduced pressure environment in the tank/reservoir 80. Hydrogen and oxygen gas are feed through gas outlet 85, as shown in FIG. 8B and conduit 86, fabricated from rubber or plastic, for transfer to engine air inlet. Additional HRF is added to tank/reservoir 80 opening 87 sealed with cap 88 as needed.

Figure 8C:
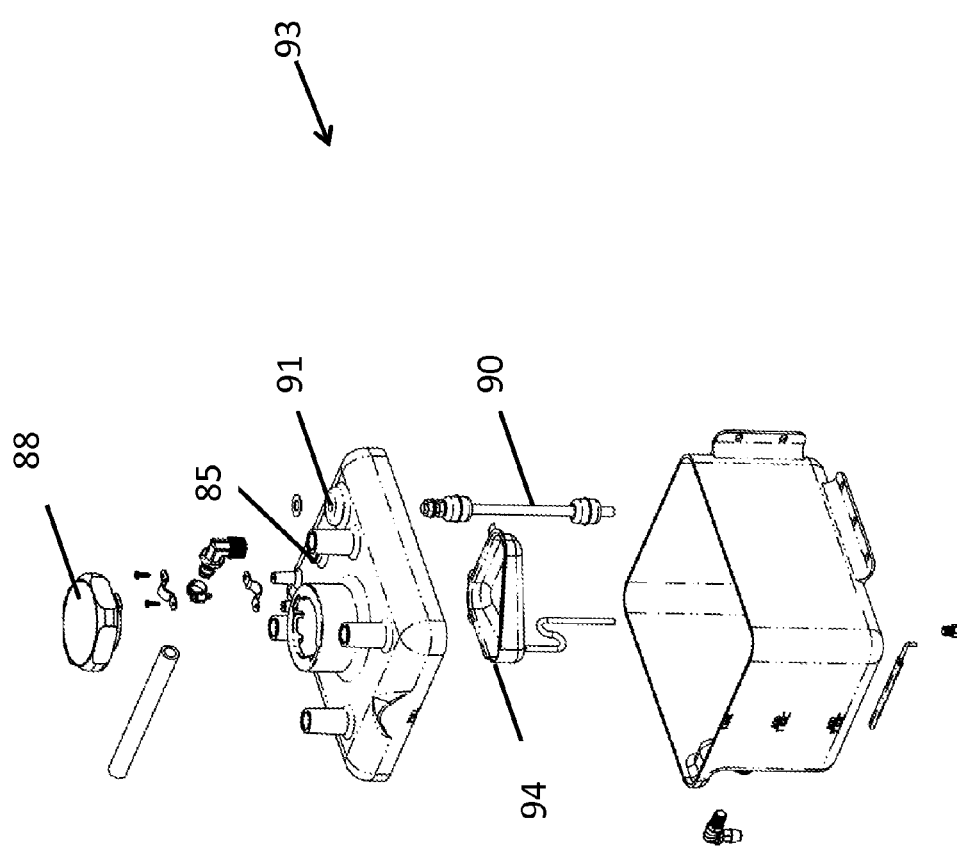
FIG. 8C is an exploded view of an alternate embodiment of the tank/reservoir of the present invention.

In one embodiment, wave formation due to vehicle movement and vibration is minimized by baffles 89. The baffles 89 reduces wave formation due to vehicle motion, which in turn permits the combination temperature/fluid level sensor 90 to provide a more accurate measurement of the fluid level in the tank. Information provided by temperature/fluid level sensor 90 is used, in combination with other operating parameters, by the electronics control system module 70 to adjust the flow to primary electrolyzer/hydrocell 110 and to advise user via display device 170 of liquid level. Temperature/fluid level sensor 90 is inserted in port 91, as shown in FIG. 8B, in cover 82. Temperature/fluid level sensor 90 provides information on the presence of fluid in tank/reservoir 80 (Full sensor), the absence (Empty) of fluid in the tank/reservoir 80, the level of fluid in the tank/reservoir 80. Support posts 92 protect cap 88 from possible damage due to larger objects that may fall or be rested on tank cover 82. The tank/reservoir 80 may be mounted external to the system to provide easy access by vehicle operator for refilling and servicing. The tank/reservoir 80 is connected to the system via appropriate conduits or tubing (not shown). In an alternate embodiment of the tank/reservoir, alternate tank/reservoir 93 is shown in FIG. 8C with splash guard 94 which reduces HRF splashing into gas outlet 85. Components of alternate tank/reservoir 93, which have the same function as the first embodiment, are numbered as in primary tank/reservoir 80.

Figure 9A:
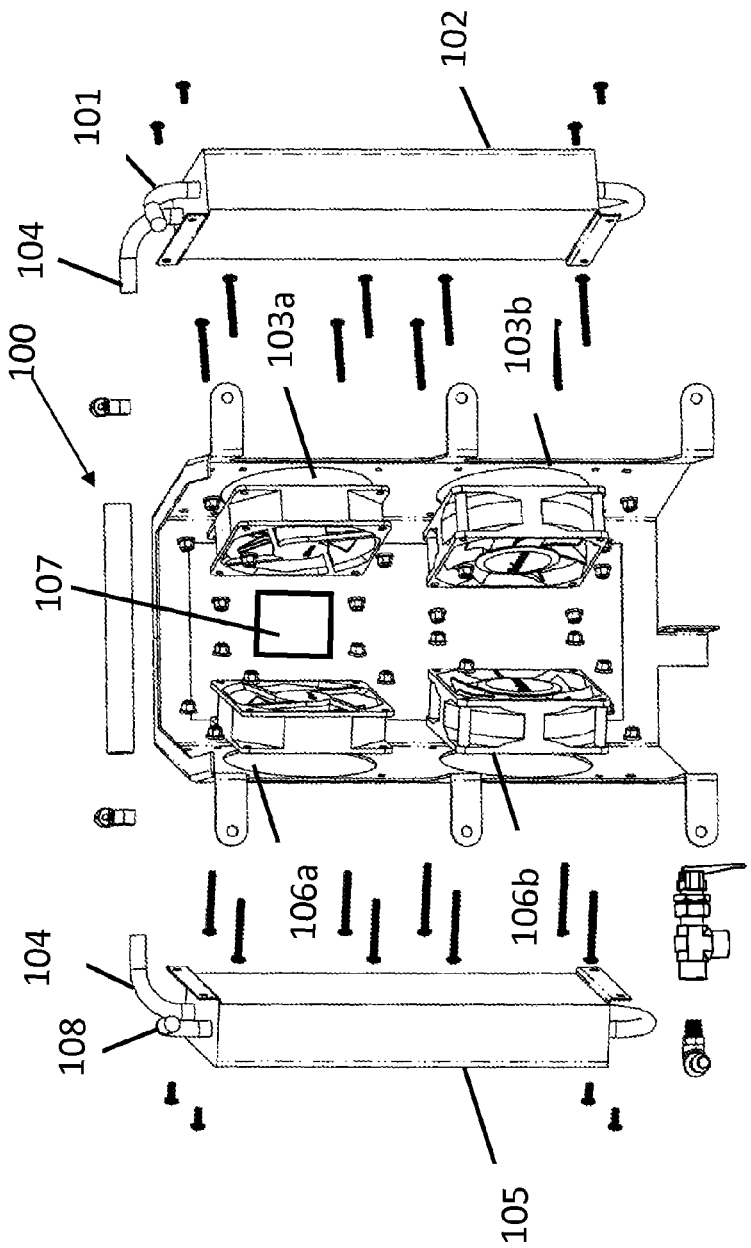
FIG. 9A is an exploded view of the radiator/intercooler components for the present invention and FIG. 9B is a front plan view of a heat exchanger detail.
Figure 9B:
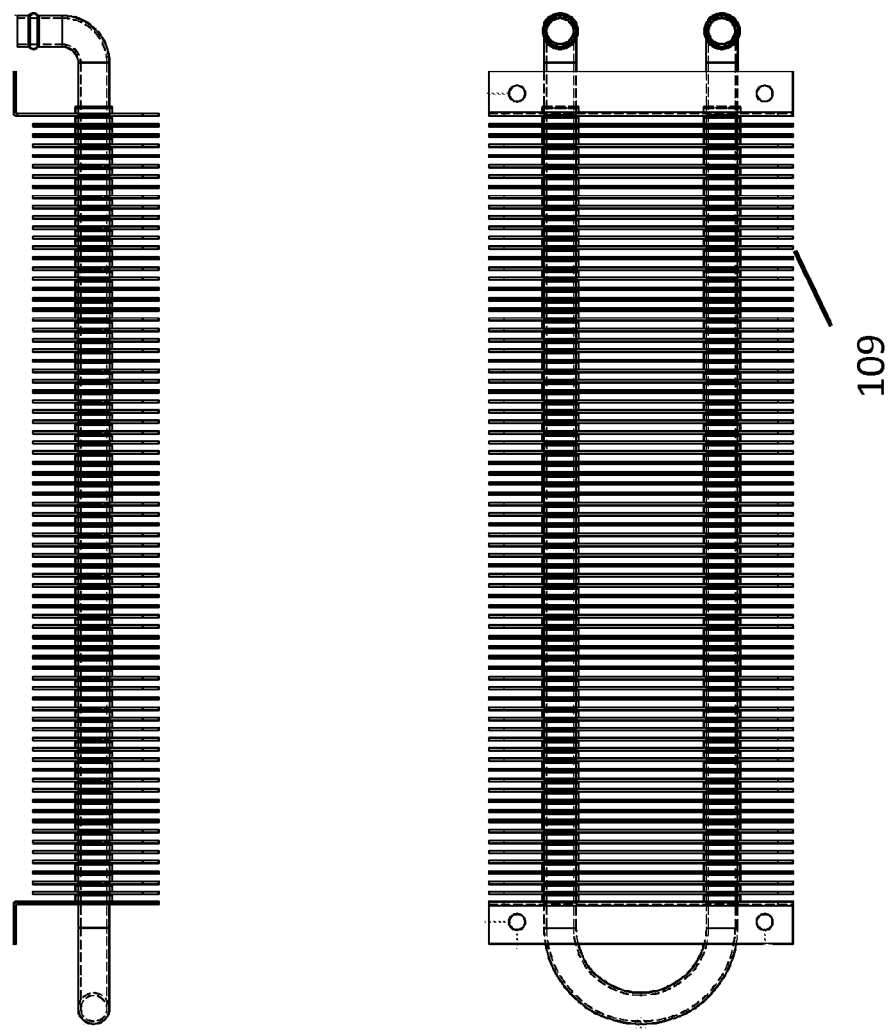

HRF flows from the tank/reservoir 80 to intercooler 100, as shown in FIG. 9A; through first inlet feed line 101 to first heat exchanger module 102, which is cooled by fans 103a and 103b. HRF flows through conduit 104 to second heat exchanger module 105 cooled by fans 106a and 106b. Temperature is monitored by thermocouple 107 and relayed back to control system module 70, to adjust fan speed or HRF flow as needed. The fans normally operated at about 13 volts (DC) and about 2 amps. HRF flows through discharge line 108 and is feed to the first electrolyzer/hydrocell 110. Typically, heat exchanger modules 102 and 105 contain a finned tube heat exchanger 109, as shown in detail in FIG. 9B. Finned tube heat exchangers provide improved heat transfer to exchange heat between heated HRF and cooling gases. Typically, the HRF is maintained at a temperature of from about 60° F. (16° C.) to about 120° F. (49° C.).

Figure 10A:
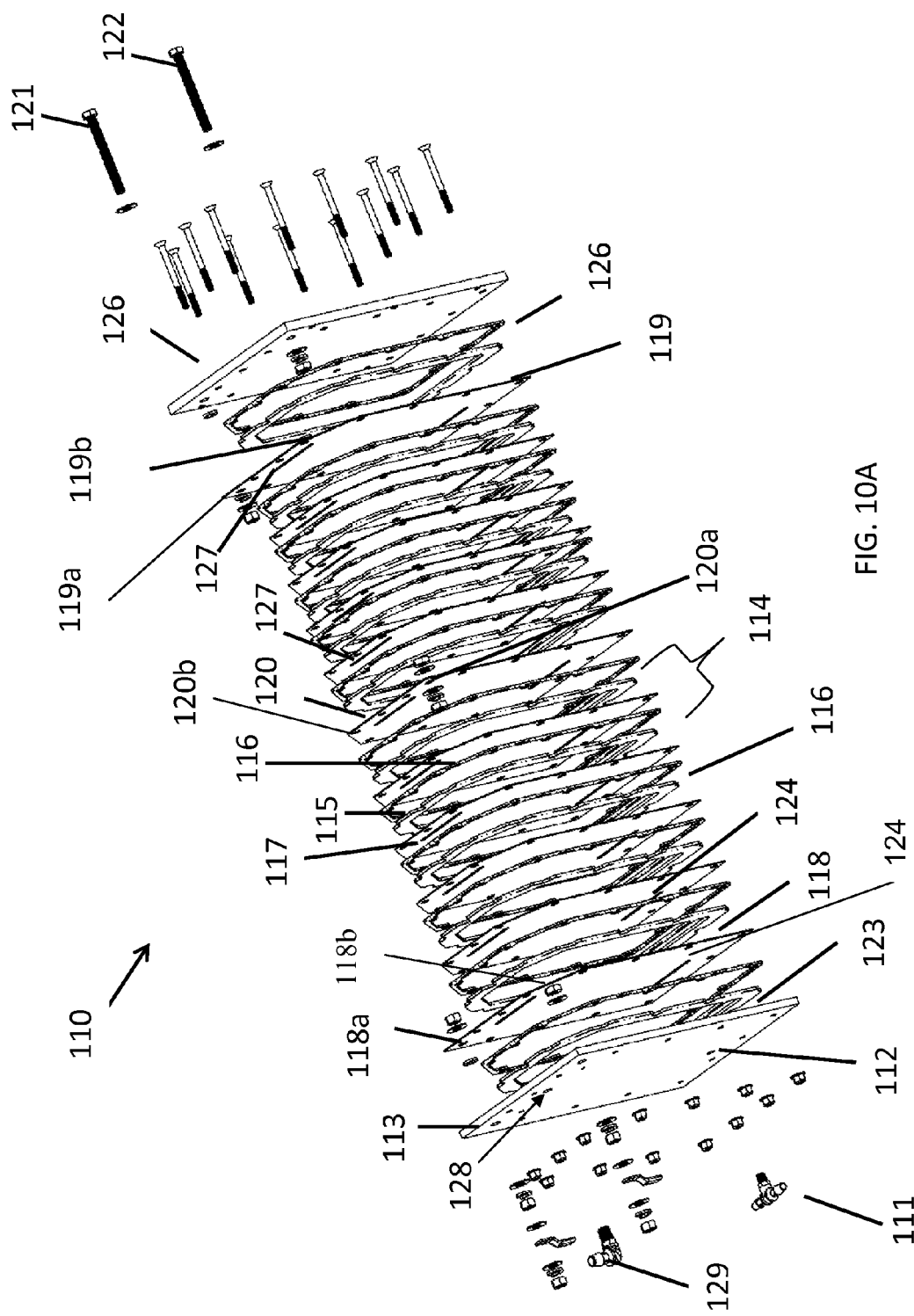
FIG. 10A is an exploded view of the electrolyzer/hydrocell of the present invention and 10B is a detail of a gasket for use with the invention.

From intercooler 100, HRF is transferred to electrolyzer/hydrocell 110, as shown in FIG. 10A under the control of electronics control system module 70 with the aid of fluid pump 160. HRF enters electrolyzer/hydrocell 110 through inlet connection 111 and inlet port 112 in front plate 113. HRF flows through electrolyzer/hydrocell 110, multiple electrolyzer unit 114 each containing a silicone gasket 115, a spacer 116 and neutral plate 117 of electrolyzer unit 114. Silicone gasket 115 is shown in detail in FIG. 10B. Each electrolyzer units 114 breaks down a quantity of HRF into the molecular units of hydrogen and oxygen by application of a current between positive power plates 118 and 119 and central negative power plate 120. Power to the electrolyzer/hydrocell 110 is provided via positive power plates 118 and 119 via positive terminal 121 and to negative power plate 120 via negative terminal 122. The positive power plates 118 and 119 have a corner 118a and 119a to engage with positive terminal 121, while missing a corner 118b and 119b so as not to engage with the negative terminal 122. Likewise, negative power plate 120 has a corner 120a to engage with negative terminal 122, while negative power plate 120 lacks a corner 120b so as not to engage with positive terminal 121. The working fluid, HRF flows through electrolyzer/hydrocell 110 through channels inlet 111, inlet port 112, gasket slot 123 in gasket 115 and plate slot 124 in neutral plates 117 travelling from front plate 113 to base plate 125 though slots 123 in gasket 115 and plate slots 124 in neutral plates 117 of each unit 114. The HRF flows to end unit 126 and back up through back plate upper slot 127 and upper slots 127 in neutral plates 117 in each unit where the fluid exits though outlet port 128 and outlet connector 129. The working fluid returns to the tank/reservoir 80 though tank inlet connector 84 where it is separated, as discussed hereinabove, into hydrogen and oxygen gas and HRF for recycling to primary electrolyzer/hydrocell 110.

Figure 11A:
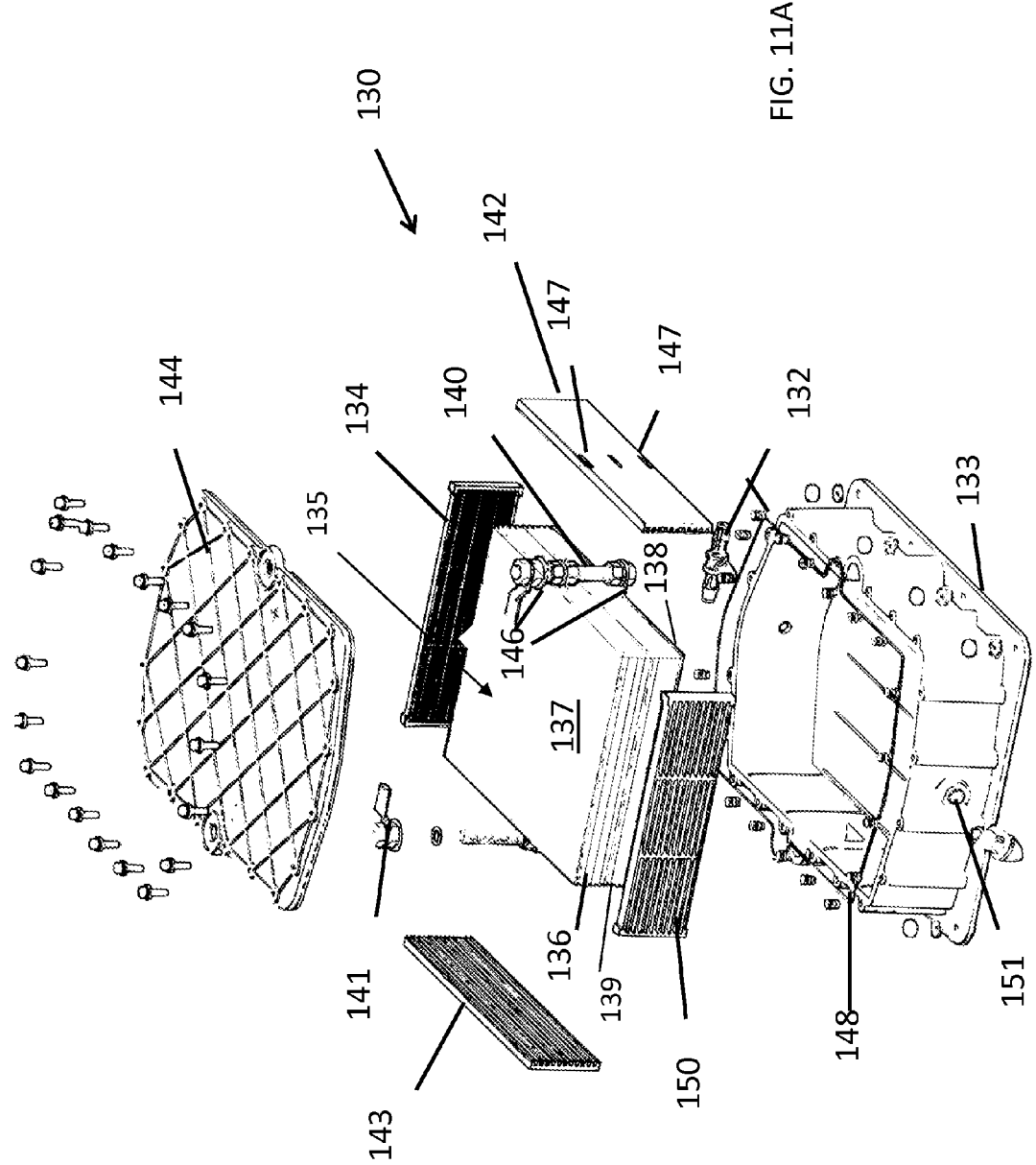
FIG. 11A is an exploded view of alternate embodiment of the electrolyzer/hydrocell of the present invention and 11B is a perspective view of a side panel of the alternate electrolyzer.
Figure 11B:
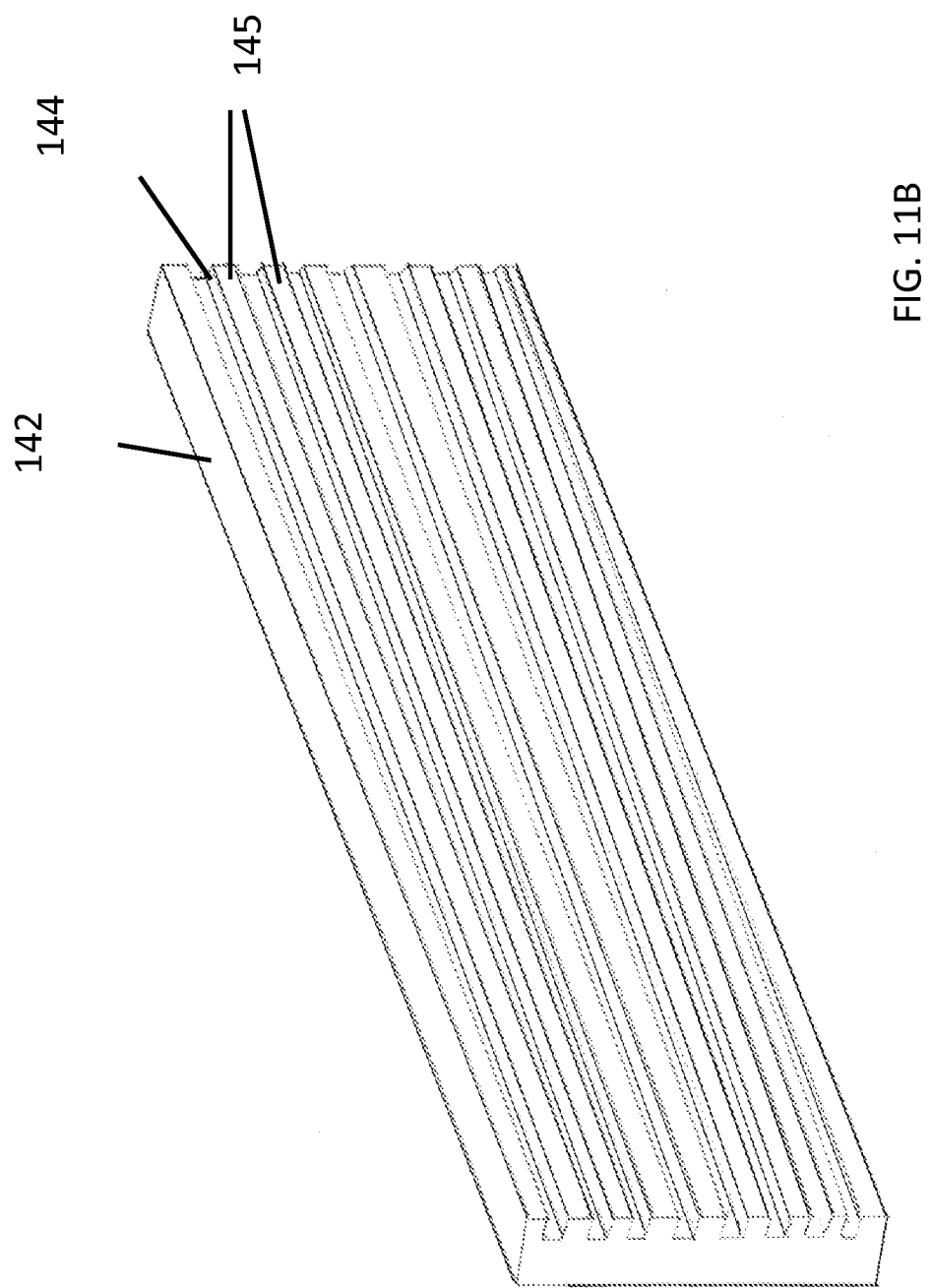

In an embodiment of the invention, HRF may flow from intercooler 100 to the inlet/drain 132 of alternate electrolyzer/hydrocell 130 in FIG. 11A. Drain permits the intercooler to be drained for regular maintenance. The HRF flows through inlet 132 through housing 133, front diffuser 134 and alternate electrolyzer cell 135. HRF flows past neutral plates 136 between upper 137 and lower 138 positive power plate and central negative plate 139 within alternate electrolyzer cell 135 to break down a quantity of water into the atomic units of hydrogen and oxygen by application of a current between positive power electrode plates 137 and 138, connected to positive electrode 140, and negative power plate 139, connected to negative electrode 141, as shown in FIG. 11b. In one embodiment, a total of eleven plates, including eight neutral plates are used with a typical 12 V battery. The positive power plates 137 and 138, negative power plate 139 and neutral plates 136 are held in place by side plates 142 and 143 having slots 144 and spacers 145, as shown in FIG. 11B. The positive power plates 137 and 138 have tabs 146 that extend through side plate 142 positive slots 147 and engage with positive electrode 140. The negative power plate 139 has a tab (not shown) that extends through side plate 143 slot (not shown) and engages with negative electrode 141. The spacers separate the plates to maintain the proper separation between plates (approximately 0.125 inches). The alternate electrolyzer/hydrocell 130 is sealed with gasket 148 and cover 149 to contain the HRF within alternate electrolyzer/hydrocell 130. HRF, hydrogen and oxygen flow through back diffuser 150 and outlet 151 where the HRF is channeled to tank 80. In an embodiment of the invention, the positive power plates 137 and 138, the negative power plate 139 and the neutral plates are fabricated from 316 stainless steel. The housing 133, front diffuser 134, side plates, 141 and 143, back diffuser 150 and alternate electrolyzer cover 149 are fabricated from a polymer, such as, but not limited to polypropylene or polyethylene. In an embodiment of the invention, the housing 133, front diffusers 133 and 150 side plates, 142 and 143 and back diffuser 150 are fabricated from a ceramic material, such as aluminum oxide.

Figure 12:
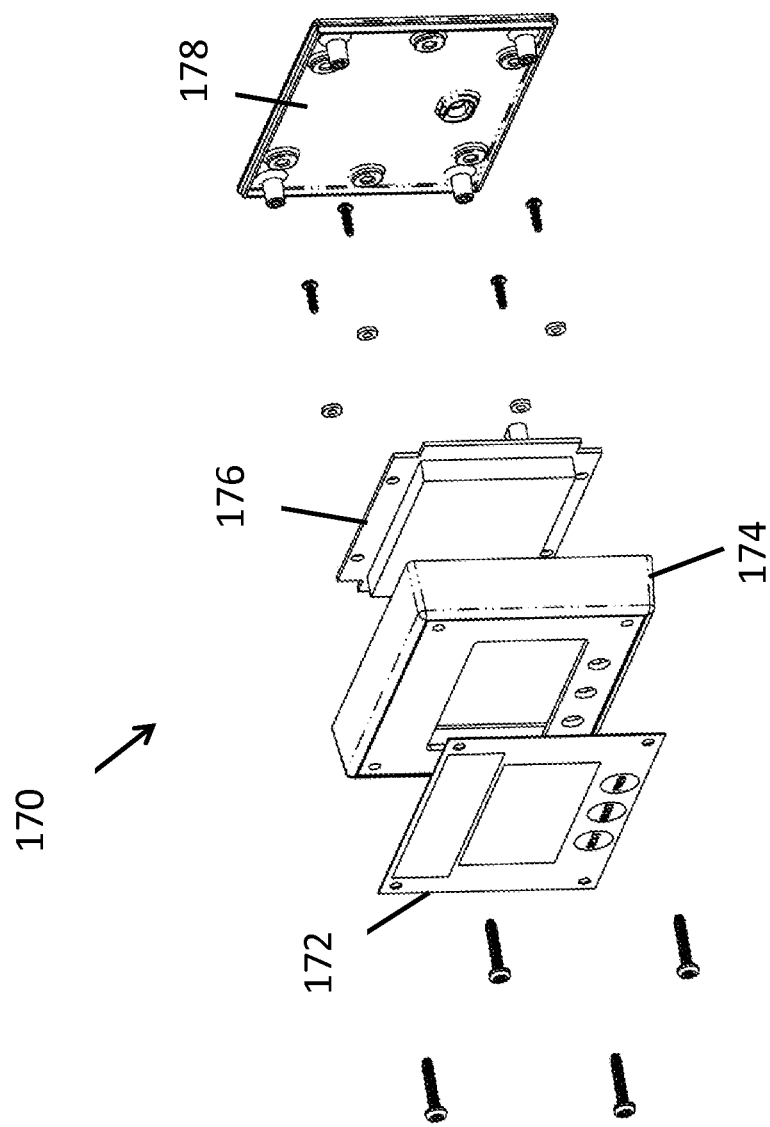
FIG. 12 is an exploded view of the display of the present invention.

The Display unit as shown generally at 170 in FIG. 12. The Display unit 170 consists of a cover panel 172, housing 174, electronics module 176 and support structure 178. The display unit presents information on system status, HRF level, process temperature, hydrogen and oxygen generation and other information to the vehicle operator.

Fluid Example 1

The three-season Hydrogen Reaction Fluid is currently formulated using about 0.64% weight percentage of an alkali hydroxide (such as sodium hydroxide) dissolved in deionized water.

The winterized versions of the reaction fluid (i.e., where ambient temperatures range from about −50 F to 32 F), have 2-Propanol as a component of its composition. The alcohol's presence is primarily to lower the freezing temperature of this mixture. Different freeze protection levels contain different alcohol percentages. An embodiment of the winter blend also contains between about 50% and 500% more chemical salts, preferably between about 75 and 300% and most preferably between about 100 and 200% more chemical salts to achieve the hydrogen production rates seen when the 3-season fluid blend is used.

Fluid Example 2

The winter blend (wherein the blend accommodates 0° F. average ambient temperatures) is currently formulated using from about 2% to about 5% by weight of alkali hydroxide (such as sodium hydroxide), preferably 2.2% to 2.8%, and most preferably about 2.3% by weight sodium hydroxide ("Alkali chemical salt"). The hydroxide is substantially completely dissolved in the deionized Water (from between 60% to 70% by formulation weight, preferably 65% to 70% and most preferably 68.7% by formulation weight). From about 15% to 40% by weight, preferably 20-35% by weight, and most preferably about 27-30% by weight of the 2-Propanol is added to the alkali hydroxide spike water and mixed to a homogeneous blend of the three ingredients.

Fluid Example 3

A second winter blend (wherein the blend accommodates ambient temperatures which average minus 10° F. utilizes between 2% and 4% by weight of alkali metal salt, preferably between about 1% and 2% and most preferably about 1.4 to 1.5% weight percentage. The salt is substantially completely dissolved in the deionized water between 50 and 70% by formulation weight, preferably between 55 and 65% and most preferably about (63% by formulation weight). Between approximately 20-45% by weight, preferably 30-40% and most preferably between about 35% and 36% by weight of the 2-Propanol is added and the three constituents homogenized.

It is to be understood that the above description is intended to be illustrative, and not restrictive. For example, the above-described embodiments (and/or aspects thereof) may be used in combination with each other. In addition many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The invention claimed is:

1. A method for enriching air with hydrogen for subsequent use in internal combustion engines, the method comprising:
   a. without preheating, supplying a modified form of water, wherein the modified form of water comprises alcohol and alkali-metal containing moiety;
   b. electrolyzing the water to produce hydrogen gas while the modified water remains in a liquid phase;
   c. mixing the hydrogen gas with air to produce a hydrogen-air mixture; and
   d. injecting the mixture into the air intake of a combustion engine, wherein said alcohol comprises medical grade alcohol having purity of at least 95 percent by weight; wherein 2% to 2.8% of the modified water comprises sodium hydroxide as the alkali-metal moiety and wherein 27% to 30% of the modified water comprises 2-propanol and wherein said water base comprises deionized water.

2. The method of claim 1 wherein the alkali-metal containing moieties are selected from the group consisting of potassium hydrogen sulfite ($KHSO_3$), sodium hydrogen sulfite ($NaHSO_3$) and combinations thereof.

3. The method of claim 1 further producing oxygen.

4. The method of claim 1 wherein the step of electrolyzing the water comprises contacting the modified form of water to a plurality of parallel flat plates maintained at a voltage potential, the plurality enclosed in a leak proof bladder and wherein the plurality of plates has a first end terminating in a positive electrode and a second end terminating in a negative electrode and the edges of the plates deviate from the plane and toward the negative electrode.

5. The method of claim 1 wherein the hydrogen-air mixture comprises between 1 to 5 volume percent of hydrogen gas to air.

6. The method of claim 1 wherein the mixture is not preheated prior to injection.

7. The method of claim 1 wherein the electrolyzing step occurs at temperatures as low as −50 F without the addition of heat.

8. The method of claim 1 wherein the step of electrolyzing water produces a mixture of hydrogen gas and the modified form of water, the method further comprising separating the hydrogen gas from the modified form of water to provide hydrogen gas and separated water and returning the separated modified form of water to the source of modified water for continued processing.

9. A system for enriching internal combustion engine air intake with hydrogen gas, the system comprising:
   a. a non-preheated, modified water, wherein the modified form of water comprises alcohol and alkali-metal containing moeity;
   b. a means for producing hydrogen gas from the modified water while the modified water remains in a liquid phase;
   c. a means for mixing the hydrogen gas with air to create a gas mixture; and
   d. a means for injecting the mixture into the air intake system of the engine wherein said alcohol comprises medical grade alcohol having purity of at least 95 percent by weight; wherein 2% to 2.8% of the modified water comprises sodium hydroxide as the alkali-metal moiety and wherein 27% to 30% of the modified water comprises 2-propanol and wherein said water base comprises deionized water.

10. The system of claim 9 wherein the alkali containing moieties are selected from the group consisting of KOH, NaOH and combinations thereof.

11. The system of claim 9 wherein the alkali containing moieties are selected from the group consisting of Potassium Carbonate ($K_2CO_3$), Sodium Carbonate (NaCO3), Potassium Hydrogen Carbonate ($KHCO_3$), Sodium Hydrogen Carbonate ($NaHCO_3$) and combinations thereof.

12. The system of claim 9 wherein the alkali containing moieties are sulfates selected from the group consisting of potassium sulfate, sodium sulfate, and combinations thereof.

13. The system of claim 9 wherein the medical grade alcohol of the modified water is a medical grade isopropyl alcohol.

* * * * *